(12) United States Patent
Yu et al.

(10) Patent No.: US 11,450,136 B2
(45) Date of Patent: Sep. 20, 2022

(54) OPTICAL LENS, FINGERPRINT RECOGNITION MODULE AND MOBILE TERMINAL

(71) Applicant: JIANGXI LIANYI OPTICS CO., LTD., Nanchang (CN)

(72) Inventors: Xiaozhi Yu, Nanchang (CN); Haojie Zeng, Nanchang (CN); Xuming Liu, Nanchang (CN); Jiyong Zeng, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 163 days.

(21) Appl. No.: 17/038,082

(22) Filed: Sep. 30, 2020

(65) Prior Publication Data

US 2021/0200975 A1 Jul. 1, 2021

Related U.S. Application Data

(63) Continuation-in-part of application No. PCT/CN2020/076472, filed on Feb. 24, 2020.

(30) Foreign Application Priority Data

Dec. 25, 2019 (CN) .......................... 201911352364.5

(51) Int. Cl.
*G06V 40/13* (2022.01)
*G02B 9/12* (2006.01)
(Continued)

(52) U.S. Cl.
CPC ......... *G06V 40/1318* (2022.01); *G02B 5/208* (2013.01); *G02B 9/12* (2013.01);
(Continued)

(58) Field of Classification Search
CPC ............. G06V 40/1318; G06V 10/751; G06V 40/1365; G02B 5/208; G02B 9/12; G02B 13/0035

See application file for complete search history.

(56) References Cited

U.S. PATENT DOCUMENTS

| | | | |
|---|---|---|---|
| 2016/0116711 A1 | 4/2016 | Lee et al. | |
| 2020/0174226 A1* | 6/2020 | Lin | ..................... G02B 13/0035 |
| 2021/0116679 A1* | 4/2021 | Li | ........................... G02B 13/18 |

FOREIGN PATENT DOCUMENTS

| | | |
|---|---|---|
| CN | 109196519 A | 1/2019 |
| CN | 109196521 A | 1/2019 |

(Continued)

OTHER PUBLICATIONS

WIPO, International search report for PCT application No. PCT/CN2020/076472, dated Sep. 9, 2020.
(Continued)

*Primary Examiner* — Abhishek Sarma

(57) ABSTRACT

The disclosure provides an optical lens, an imaging device, a fingerprint recognition module and a mobile terminal, along an optical axis from an object side to an image side, the optical lens sequentially including: a flat glass, a first lens, a stop, a second lens, a third lens, and an infrared filter. The optical lens satisfy a high-quality resolution, also have the advantages of small size, small distortion, and high relative illumination, they can effectively improve the rate of the fingerprint recognition, and more suitable for the design requirements of the full screen of the mobile phones. Meanwhile, the three lenses of the optical lens of the present disclosure all use low refractive index materials, which greatly reduces the production cost, and is more in line with the low-cost and high-performance development trend of the full screen of the mobile phone.

20 Claims, 10 Drawing Sheets

(51) Int. Cl.
 *G02B 5/20* (2006.01)
 *G02B 13/00* (2006.01)
 *G06V 10/75* (2022.01)
 *G06V 40/12* (2022.01)

(52) U.S. Cl.
 CPC ....... *G02B 13/0035* (2013.01); *G06V 10/751* (2022.01); *G06V 40/1365* (2022.01)

(56) References Cited

FOREIGN PATENT DOCUMENTS

| | | |
|---|---|---|
| CN | 208460036 U | 2/2019 |
| CN | 208888457 U | 5/2019 |
| CN | 209388019 U | 9/2019 |
| CN | 110764234 A | 2/2020 |
| JP | 2009223085 A | 10/2009 |
| TW | I679449 B | 12/2019 |

OTHER PUBLICATIONS

WIPO, Written opinion of the international search authority for PCT application No. PCT/CN2020/076472, dated Sep. 9, 2020.
SIPO, First Office Action for CN application No. 201911352364.5, dated Feb. 13, 2020.
SIPO, Notification to Grant Patent Right for Invention for CN application No. 201911352364.5, dated Mar. 3, 2020.

\* cited by examiner

OPTICAL LENS, FINGERPRINT RECOGNITION MODULE AND MOBILE TERMINAL

CROSS REFERENCE TO RELATED APPLICATION(S)

This application is a continuation-in-part of International Application No. PCT/CN2020/076472, filed on Feb. 24, 2020, titled "OPTICAL LENS AND IMAGING DEVICE". The International Application No. PCT/CN2020/076472 claims priority to a Chinese application NO. 2019113523645 filed on Dec. 25, 2019, titled "OPTICAL LENS AND IMAGING DEVICE." The entirety of the above-mentioned applications is hereby incorporated by reference herein.

TECHNICAL FIELD

The present disclosure relates to the field of lens imaging technologies, and more particularly, to an optical lens, an imaging device, a fingerprint recognition module and a mobile terminal.

BACKGROUND

With the continuous development of mobile information technology, mobile electronic devices such as mobile phones are also moving in the direction of ultra-thin, full-screen ultra-high-definition imaging. With the popularization of the full-screen concept, under-screen fingerprint recognition technology emerged. Due to the advantages of small size and short total length of optical under-screen fingerprint recognition systems, it has been widely used in various full-screen mobile phones. As consumers' demand for full-screen mobile phones continues to increase, the demand for optical lenses for under-screen fingerprint recognition continues to rise.

However, in the related art, the optical lens used in fingerprint recognition under the screen still has the disadvantages of poor imaging quality and large distortion, which leads to the problem of low fingerprint recognition rate, making the poor experience of the smart phones, and most of the optical lenses of the fingerprint under the screen are made of high refractive index materials, which makes the cost of the production is large and is not suitable for the promotion and application of the market.

SUMMARY

Based on this, the present disclosure aims to provide an optical lens, an imaging device, a fingerprint recognition module and a mobile terminal, the optical lens at least has the characteristics of high imaging quality, small size and small distortion, and can effectively improve the fingerprint recognition rate and better suit the needs of the full-screen.

The embodiments of the present disclosure achieve the aims through the following technical solutions:

In the first aspect, the present disclosure provides an optical lens. The optical lens has an optical axis, in order along the optical axis from an object side to an image side, the optical lens sequentially includes a flat glass, a first lens, a stop, a second lens, a third lens, and an infrared filter. The first lens has a negative refractive power, an object side surface of the first lens adjacent to the optical axis is concave and has at least one inflection point, an image side surface of the first lens is concave; the second lens has a positive refractive power, an object surface of the second lens is convex, and an image side surface of the second lens is convex; the third lens has a positive refractive power, an image side surface of the third lens is convex; the first lens, the second lens and the third lens are made of a material with a refractive index of less or equal to 1.70; wherein, the optical lens satisfies an expression: $1.5<f3/f<2.2$, f3 represents an effective focal length of the third lens, f represents an effective focal length of the optical lens.

In the second aspect, the present disclosure provides an imaging device including the optical lens in the first aspect and an imaging element, the imaging element is configured to convert optical images formed by the optical lens into electrical signals.

In a third aspect, the present disclosure provides a fingerprint recognition module including an optical lens as described in the first aspect, an image sensor, a memory, and a processor, wherein the optical lens and the image sensor are cooperated to capture one or more fingerprint images, the memory is configured for storing at least one preset template and the captured fingerprint images, and the processor is configured for identifying whether the captured fingerprint images match with the preset template, and determining whether to allow the user to log in or not.

In a fourth aspect, the present disclosure provides a mobile terminal including the fingerprint recognition module as described in the third aspect, a housing and a display screen, wherein the fingerprint recognition module and the display screen are engaged with the housing.

Compared with the related art, the optical lens, imaging device, a fingerprint recognition module and a mobile terminal provided in the present disclosure through the reasonably set of the stop and each lens, while satisfying the high-quality resolution, it also has the characteristics of small size, small distortion, high relative illumination, effectively improved the rate of the fingerprint recognition, and more suitable for the requirements of design of the full screen of the mobile phones. The optical lens satisfies the expression: $1.5<f3/f<2.2$, which can make the third lens has a large positive refractive power, and helpful to improve the resolution of the optical lens.

These or other aspects of the disclosure will be more concise and understandable in the description of the following embodiments.

REFERENCE NUMERALS OF MAIN COMPONENTS

Figure 1:
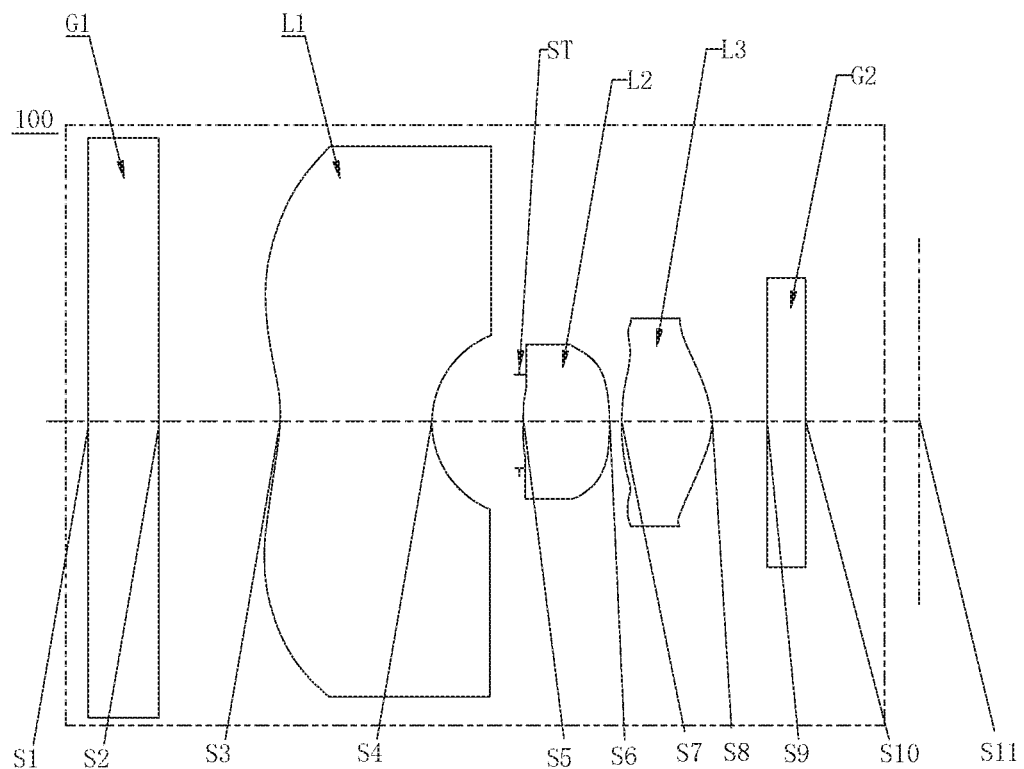
FIG. 1 is a schematic structural diagram of an optical lens in a first embodiment of the disclosure.

| | | | |
|---|---|---|---|
| flat glass | G1 | first lens | L1 |
| second lens | L2 | third lens | L3 |
| stop | ST | infrared filter | G2 |
| an object side surface of the flat glass | S1 | an image side surface of the flat glass | S2 |
| an object side surface of the first lens | S3 | an image side surface of the first lens | S4 |
| an object side surface of the second lens | S5 | an image side surface of the second lens | S6 |
| an object side surface of the third lens | S7 | an image side surface of the third lens | S8 |
| an object side surface of the infrared filter | S9 | an image side surface of the infrared filter | S10 |
| imaging side | S11 | imaging device | 500 |
| imaging element | 510 | optical lens | 100, 200, 300, 400 |

The following embodiments will further illustrate the present disclosure with reference to the above drawings.

DETAILED DESCRIPTION OF PREFERRED EMBODIMENTS

In order to facilitate a better understanding of the present disclosure, the present disclosure will be further explained below with reference to the accompanying drawings. The embodiments of the present disclosure are shown in the drawings, but the present disclosure is not limited to the above-mentioned preferred embodiments. Rather, these embodiments are provided to make the disclosure of the present disclosure more sufficient.

Unless defined otherwise, all technical and scientific terms used herein have the same meaning as commonly understood by one of ordinary skill in the art to which this disclosure belongs. The terminology used herein in the description of the disclosure is for the purpose of describing particular embodiments only and is not intended to limit the disclosure. The term "and/or" as used herein includes any and all combinations of one or more of the associated listed items.

The embodiment of the present disclosure provides an optical lens. In an order along an optical axis from an object side to an image side, the optical lens sequentially includes: a flat glass, a first lens, a stop, a second lens, a third lens, and an infrared filter. The first lens has a negative refractive power, an object side surface of the first lens adjacent to the optical axis is a concave surface and has at least one inflection point, an image side surface of the first lens is a concave surface. The second lens has a positive refractive power, an object surface of the second lens is a convex surface, and an image side surface of the second lens is a convex surface. The third lens has a positive refractive power, an image side surface of the third lens is a convex surface. The first lens, the second lens and the third lens are made of a material with a refractive index of less than or equal to 1.70. The optical lens meets the expression: $1.5<f3/f<2.2$, where f3 represents an effective focal length of the third lens, f represents an effective focal length of the optical lens.

By appropriately setting the stop and the lenses, the optical lens provided in the present disclosure satisfies a high-quality resolution, and also has the characteristics of small size, small distortion, high relative illumination, effectively improve the rate of the fingerprint recognition, and more suitable for the design requirements of the full screen of the mobile phones. The optical lens satisfies the expression: $1.5<f3/f<2.2$, which can make the third lens has a relatively large positive refractive power, and is helpful to improve the resolution of the optical lens. When the optical lens is used, the fingerprint of user's finger is in direct contact with the flat glass, the flat glass not only plays an optical role in the optical lens, but also protects the optical lens.

In some embodiments, the optical lens satisfies the following expression:

$$0.9<Vd2/Vd3<1; \quad (1)$$

where Vd2 represents an abbe number of the second lens, Vd3 represents an abbe number of the third lens. Satisfying the expression (1) is beneficial to improve the image resolution force of the optical lens.

In some embodiments, the optical lens satisfies the following expressions:

$$1.0<Nd1<1.65; \quad (2)$$

$$1.0<Nd2<1.55; \quad (3)$$

$$1.0<Nd3<1.55; \quad (4)$$

where Nd1 represents a refractive index of the first lens, Nd2 represents a refractive index of the second lens, and Nd3 represents a refractive index of the third lens. Satisfying the expressions (2) to (4), can ensure each lens has a small refractive index, and is beneficial to the correction of field curvature and distortion. The three lenses adopt low refractive index material, which can effectively reduce the costs of the production.

In some embodiments, the optical lens satisfies the following expression:

$$0.4<(TC1/ET1)-(TC1/SDM11)<0.9; \quad (5)$$

where TC1 represents a center thickness of the first lens, SDM11 represents a half-diameter of the object side surface of the first lens, ET1 represents an edge thickness of the first lens. Satisfying the expression (5) is beneficial to reduce the size of the head of the lens, thereby shortening the total length of the lens, and achieving miniaturization of the optical lens.

In some embodiments, the optical lens satisfies the following expression:

$$1.0 \text{ mm} < f1+f2+f3 < 2.1 \text{ mm}; \tag{6}$$

where f1 represents an effective focal length of the first lens, f2 represents an effective focal length of the second lens, f3 represents an effective focal length of the third lens. Satisfying the expression (6), can control the refractive power of the first lens, the second lens and the third lens reasonably, reduce the correction of advanced aberration, and can reduce the difficulty of aberration correction of the overall optical lens.

In some embodiments, the optical lens satisfies the following expression:

$$1.2 < MTC1/TC1 < 1.6; \tag{7}$$

where MTC1 represents the maximum thickness of the first lens parallel to the optical axis direction, TC1 represent a center thickness of the first lens. Satisfying the expression (7), the size of the first lens can be small, which is beneficial to the miniaturization of the optical lens and the molding of the first lens, and the yield is improved.

In some embodiments, the optical lens satisfies the following expression:

$$0.2 < (R31+R32)/(R31-R32) < 0.5; \tag{8}$$

where R31 represents a radius of curvature of the object side surface of the third lens, R32 represents a radius of curvature of the image side surface of the third lens. Satisfying the expression (8) enables the third lens provide positive refractive power and converge the light, which is beneficial to the correction of field curvature and distortion, and improves the resolution of the lens.

In some embodiments, the optical lens optical lens satisfies the following expression:

$$1.6 < R31/SDM31 < 4.3; \tag{9}$$

where R31 represents a radius of curvature of the object side surface of the third lens, SDM31 represents a half-diameter of the object side surface of the third lens. Satisfying the expression (9) can make the aperture of the third lens smaller, which is beneficial to the correction of distortion and aberration, and is beneficial to the molding of the third lens, and improves the yield.

In some embodiments, the optical lens optical lens satisfies the following expression:

$$-2.1 < R11/f1 < -1.5 \tag{10}$$

where R11 represents a radius of curvature of the object side surface of the first lens, f1 represents an effective focal length of the first lens. Satisfying the expression (10), the refractive power of the first lens can be controlled reasonably, which is beneficial to the correction of the peripheral field of view aberration and the improvement of the relative illumination of the peripheral field of view.

In some embodiments, the optical lens optical lens satisfies the following expression:

$$0.3 \text{ mm} < IMC23+TC3 < 0.4 \text{ mm}; \tag{11}$$

where IMC23 represents a distance along the optical axis between the image side surface of the second lens and the object side surface of the third lens, TC3 represents a center thickness of the third lens. Satisfying the expression (11) can reasonably distribute the space between the lenses, adjust the light distribution, and improve the relative illumination of the lens.

In some embodiments, the optical lens optical lens satisfies the following expression:

$$-1.9 < R21/R22 < -0.2; \tag{12}$$

where R21 represents a radius of curvature of the object side surface of the second lens, R22 represents a radius of curvature of the image side surface of the second lens. Satisfying the expression (12) can effectively control the refractive power of the second lens, slow down the tendency of light turning, reduce the difficulty of aberration correction, and improve the relative illumination and resolution of the lens.

The shapes of aspheric surfaces of the optical lens provided by the embodiments of the present disclosure satisfy the following equation:

$$z = \frac{ch^2}{1+\sqrt{1-(1+k)c^2h^2}} + \sum A_{2i}h^{2i}$$

where z represents a distance vector from the vertex of the aspheric surface when the aspheric surface is at the height h along the optical axis direction, c represents the paraxial curvature radius of the surface, k represents the quadric surface coefficient, and $A_{2i}$ represents the aspheric surface of the second order Shape factor.

In the following embodiments, the thickness, radius of curvature, and material selection of each lens in the imaging lens are different. For specific differences, see the parameter table of each embodiment.

First Embodiment

Please refer to FIG. 1, which is a structural diagram of an optical lens 100 provided in a first embodiment of the disclosure. In an order along an optical axis from an object side to an image side, the optical lens 100 sequentially includes a flat glass G1, a first lens L1, a stop ST, a second lens L2, a third lens L3, and an infrared filter G2.

The first lens L1 is a plastic aspheric lens having a negative refractive power, an object side surface S3 of the first lens adjacent to the optical axis is a concave surface, an image side surface S4 of the first lens is a concave surface. The object side surface S3 of the first lens has an inflection point, a vertical distance from the inflection point to the optical axis is 0.610 mm, and a sagittal height of the inflection point with respect to the center of the object side surface S3 of the first lens is −0.055 mm.

The second lens L2 is a plastic aspheric lens having a positive refractive power, an object side surface S5 of the second lens is a convex surface, an image side surface S6 of the second lens is a convex surface.

The third lens L3 is a plastic aspheric lens having a positive refractive power. An object side surface S7 of the third lens adjacent to the optical axis is a convex surface and has at least one inflection point, this inflection point is beneficial to improve the relative illumination of the peripheral field of view. An image side surface S8 of the third lens is a convex surface.

In some embodiments, at least one of the first lens L1, the second lens L2, and the third lens L3 may be a glass lens.

Related parameters of each lens in the optical lens 100 are shown in Table 1, where R represents the radius of the curvature, d represents the distance between the optical surfaces, Nd represents the d-line refractive index of the material, and Vd represents the abbe number of the material.

TABLE 1

| Surface No. | Sign | R (mm) | d (mm) | Nd | Vd |
|---|---|---|---|---|---|
| | Object side | — | | | |
| S1 | Flat glass G1 | — | 1.46500 | 1.5168 | 64.167 |
| S2 | | | 1.05406 | | |
| S3 | First lens L1 | −1.16619 | 0.58124 | 1.535 | 55.711 |
| S4 | | 0.70725 | 0.34312 | | |
| | Stop ST | — | 0.00424 | | |
| S5 | Second lens L2 | 1.46490 | 0.31922 | 1.5439 | 55.951 |
| S6 | | −3.00832 | 0.05376 | | |
| S7 | Third lens L3 | 0.86889 | 0.33122 | 1.5439 | 55.951 |
| S8 | | −0.53556 | 0.22011 | | |
| S9 | Infrared filter G2 | — | 0.14500 | 1.5231 | 54.513 |
| S10 | | — | 0.42854 | | |
| S11 | Imaging surface | — | — | | |

The coefficients of the aspheric surfaces of the optical lens 100 of this embodiment are shown in Table 2.

TABLE 2

| Surface No. | k | $A_4$ | $A_6$ | $A_8$ | $A_{10}$ | $A_{12}$ | $A_{14}$ | $A_{16}$ |
|---|---|---|---|---|---|---|---|---|
| S3 | −16.5563 | 0.41377 | −0.3631 | 0.20697 | −0.0554 | −0.0022 | 0.00846 | −0.0026 |
| S4 | 1.93947 | 1.91834 | −14.248 | 527.225 | −3641.8 | −28534. | 452728 | −152798 |
| S5 | 30.1100 | −4.2273 | 14.0792 | −2158.7 | 32642.7 | −194446 | 811629 | −100713 |
| S6 | 29.1317 | −6.4780 | 23.7145 | −240.00 | 1674.95 | −6372.7 | −182607 | 1204681 |
| S7 | −24.0054 | −1.2143 | 14.2186 | −143.77 | −116.14 | 3603.57 | −356.39 | −23570 |
| S8 | −2.13100 | 0.95861 | 1.31410 | −14.137 | 88.3207 | −112.27 | −1617.9 | 6532.06 |

Figure 2:
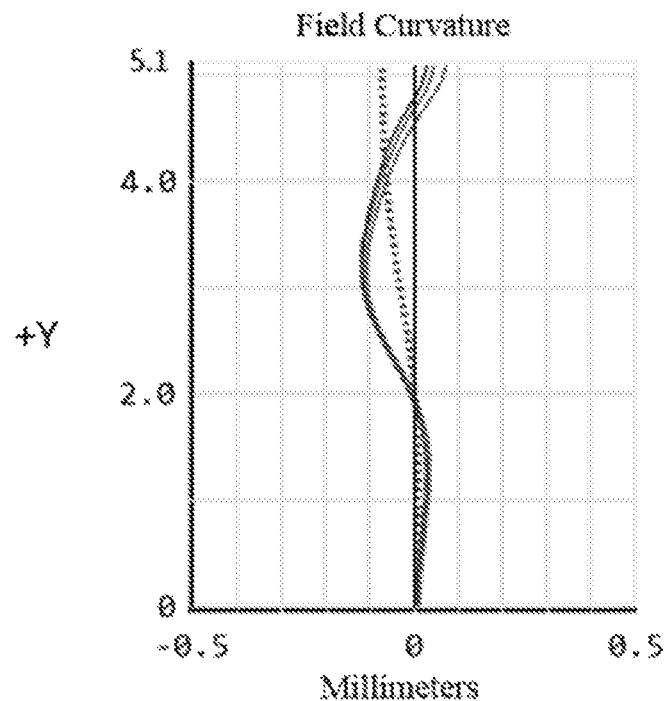
FIG. 2 is a field curvature diagram of the optical lens in the first embodiment of the disclosure, where the horizontal axis represents the shift (unit: mm), and the vertical axis represents the object height (unit: mm)
Figure 3:
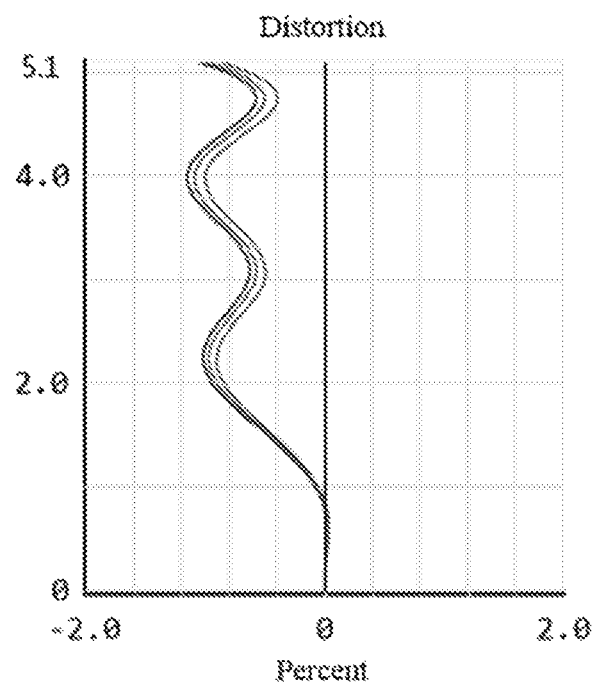
FIG. 3 is a distortion curve diagram of the optical lens in the first embodiment of the disclosure, where the horizontal axis represents the distortion percentage and the vertical axis represents the object height (unit: mm)
Figure 4:
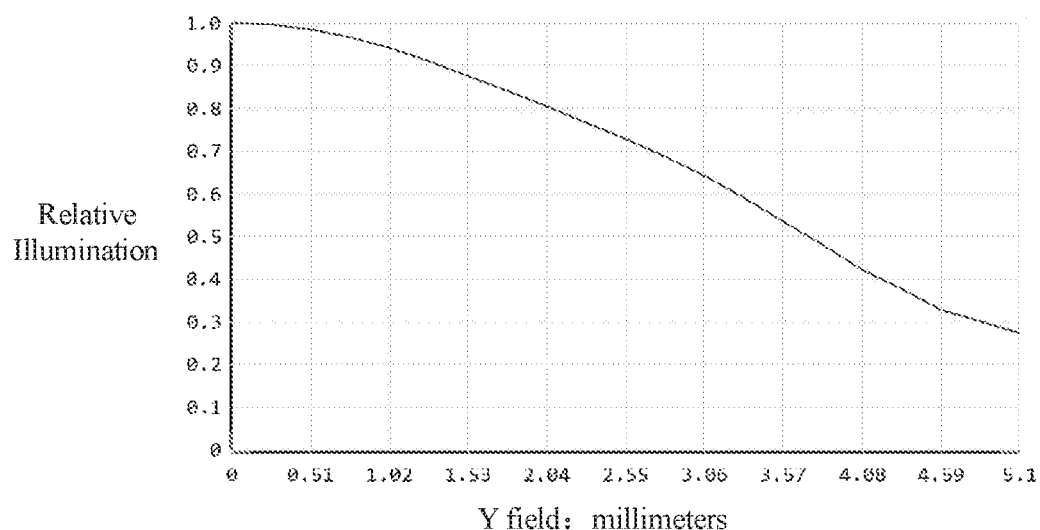
FIG. 4 is the relative illumination curve of the optical lens in the first embodiment of the disclosure, where the horizontal axis represents the object height (unit: mm), and the vertical axis represents the relative illumination value.

In this embodiment, the field curvature, the distortion and the relative illumination of the optical lens 100 are respectively shown in FIG. 2, FIG. 3 and FIG. 4. (The field of view and the object height can be converted; most lenses are designed by limiting the field of view. The optical lens in the embodiment is designed by limiting the photographing height, i.e., the height of the fingerprint collection area, the figure represented by the object height is more intuitive) As can be seen from FIG. 2, the meridional field curvature and the sagittal field curvature of this embodiment are within ±0.15 mm, which indicates the field curvature is well corrected. As can be seen from FIG. 3, the distortion of this embodiment is within ±1.2%, which indicates that the distortion is well corrected. As can be seen from FIG. 4, the relative illumination at the measured object height of 2.55 mm reaches more than 70%, and the relative illumination at the peripheral field of view is also relatively high, which indicates that the relative illumination of the optical lens 100 has been improved.

Second Embodiment

Figure 5:
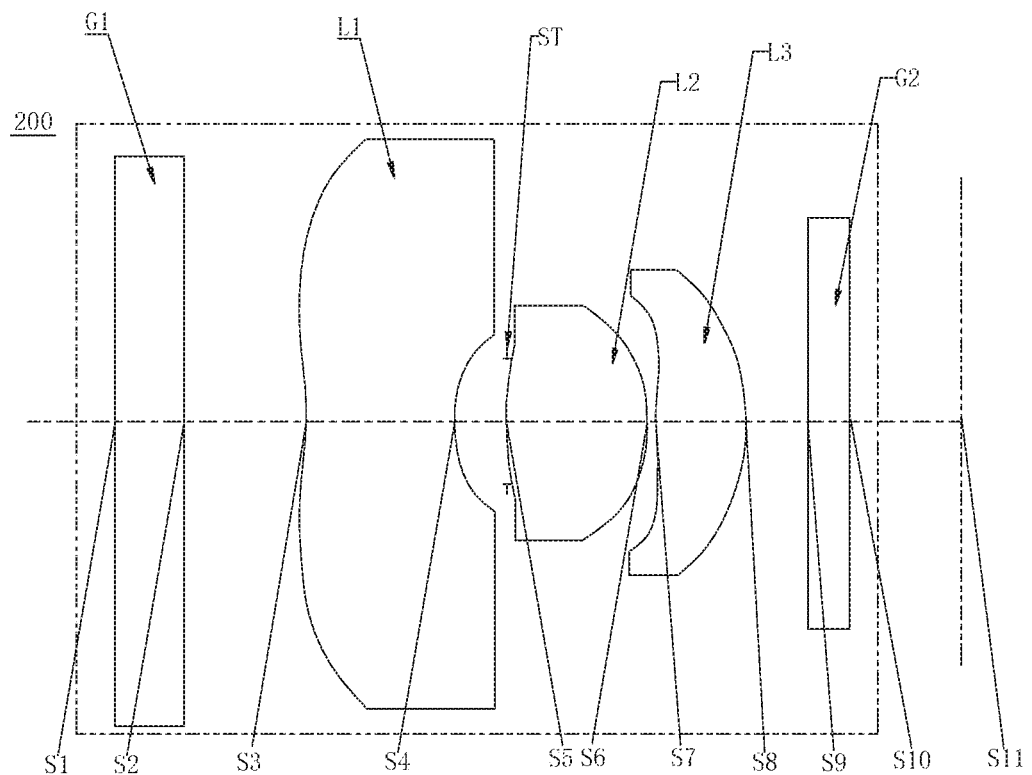
FIG. 5 is a schematic structural diagram of an optical lens in a second embodiment of the disclosure.

Please refer to FIG. 5, which is a structural diagram of an optical lens 200 provided in this embodiment. The optical lens 200 in this embodiment is substantially similar to the optical lens 100 in the first embodiment expect that: the thickness of a flat glass G1 of the optical lens 200 is different, the whole object side surface S7 of the third lens L3 is a concave surface, and has at least one inflection point; and the curvature radius and the materials of every lens are different. In this embodiment, the vertical distance from the inflection point of the object side surface S3 of the first lens L1 of the optical lens 200 to the optical axis is 0.395 mm, and the height of the inflection point relative to the center of the object side surface S3 of the first lens L1 is −0.020 mm.

Related parameters of each lens of the optical lens 200 are shown in Table 3.

TABLE 3

| Surface No. | Sign | R (mm) | d (mm) | Nd | Vd |
|---|---|---|---|---|---|
| | Object side | — | | | |
| S1 | Flat glass G1 | — | 1.47900 | 1.5168 | 64.167 |
| S2 | | — | 1.36715 | | |
| S3 | First lens L1 | −1.41159 | 0.53329 | 1.6355 | 23.972 |
| S4 | | 0.75934 | 0.18709 | | |
| | Stop ST | — | −0.00638 | | |
| S5 | Second lens L2 | 1.21421 | 0.49546 | 1.535 | 55.711 |
| S6 | | −0.64648 | 0.03501 | | |
| S7 | Third lens L3 | 1.94206 | 0.31088 | 1.5439 | 55.951 |
| S8 | | −0.66847 | 0.22011 | | |
| S9 | Infrared filter G2 | — | 0.14500 | 1.5231 | 54.513 |
| S10 | | — | 0.39850 | | |
| S11 | Imaging surface | — | — | | |

The coefficients of the aspheric surfaces of the optical lens 200 of this embodiment are shown in Table 4-1 and Table 4-2.

TABLE 4-1

| Surface No. | k | $A_4$ | $A_6$ | $A_8$ |
|---|---|---|---|---|
| S3 | −57.8441 | 0.6187 | −0.5620 | 0.3180 |
| S4 | −37.8203 | 15.1486 | −64.3631 | −547.1322 |
| S5 | 15.0983 | −2.4910 | 71.8848 | −2058.8840 |
| S6 | 0.77125 | −4.4613 | 65.8641 | −761.4330 |
| S7 | 9.03635 | −3.6276 | 5.8273 | 7.3821 |
| S8 | −2.72961 | −0.4229 | 8.1235 | −108.9215 |

TABLE 4-2

| Surface No. | $A_{10}$ | $A_{12}$ | $A_{14}$ | $A_{16}$ |
|---|---|---|---|---|
| S3 | −0.0250 | −0.0001 | 0.0210 | −0.0259 |
| S4 | 2.59E+04 | −3.45E+05 | 3.35E+06 | −1.63E+07 |
| S5 | 1.41E+04 | −5.85E+04 | 2.48E+06 | −2.32E+07 |
| S6 | 2.98E+03 | 1.19E+04 | −1.41E+05 | 3.60E+05 |
| S7 | −1.60E+02 | −4.04E+02 | −1.34E+04 | 6.85E+04 |
| S8 | 414.2646 | 6.1794 | −4414.4107 | 9036.6949 |

Figure 6:
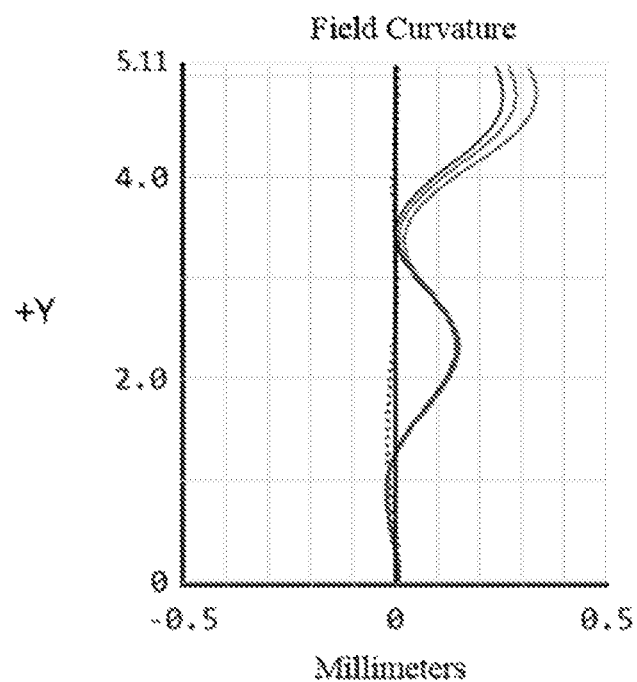
FIG. 6 is a field curvature diagram of the optical lens in the second embodiment of the disclosure.
Figure 7:
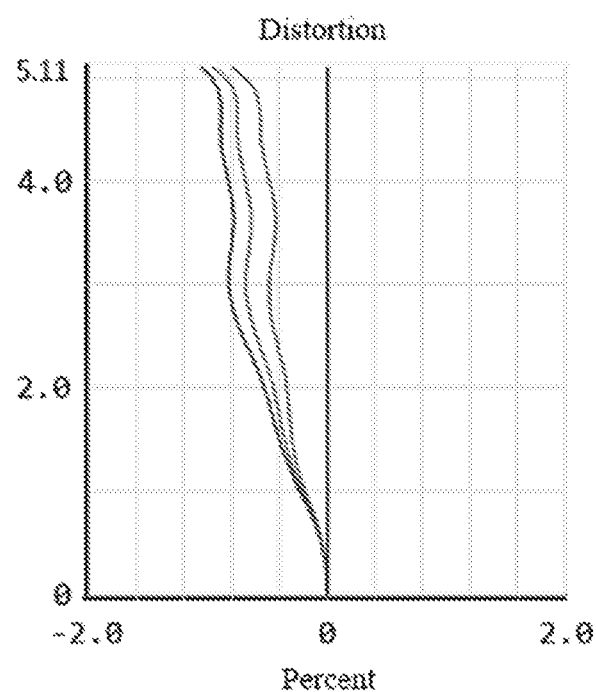
FIG. 7 is a distortion curve diagram of the optical lens in the second embodiment of the disclosure.
Figure 8:
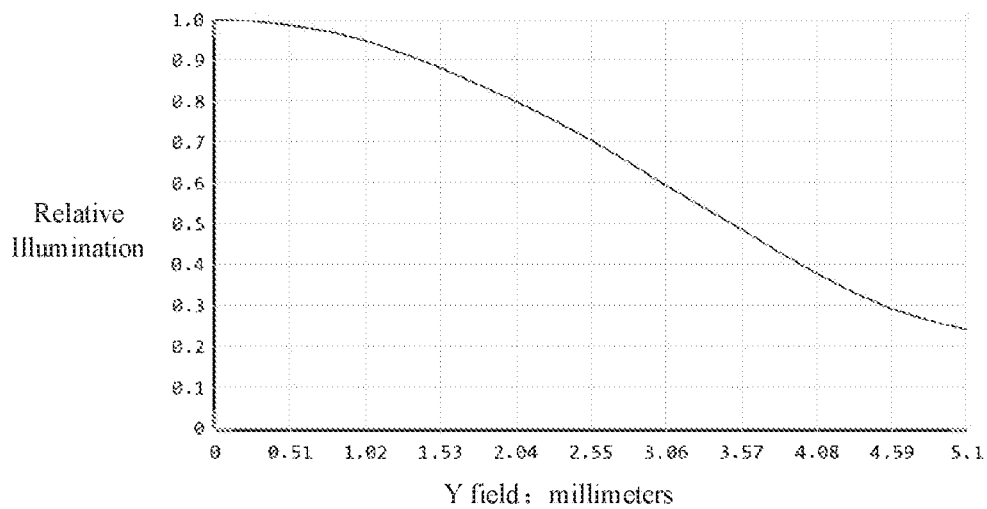
FIG. 8 is a relative illumination curve of the optical lens in the second embodiment of the disclosure.

In this embodiment, the field curvature, the distortion and the relative illumination of the optical lens 200 are respectively shown in FIG. 6, FIG. 7 and FIG. 8. As can be seen from FIG. 6, the meridional field curvature and the sagittal field curvature of this embodiment are within ±0.35 mm, which indicates the field curvature is well corrected. As can be seen from FIG. 7, the distortion of this embodiment is within ±1.2%, which indicates that the distortion is well corrected. As can be seen from FIG. 8, the relative illumination at the measured object height of 2.55 mm reaches more than 70%, and the relative illumination at the peripheral field of view is also relatively high, which indicates that the relative illumination of the optical lens 200 has been improved.

Third Embodiment

Figure 9:
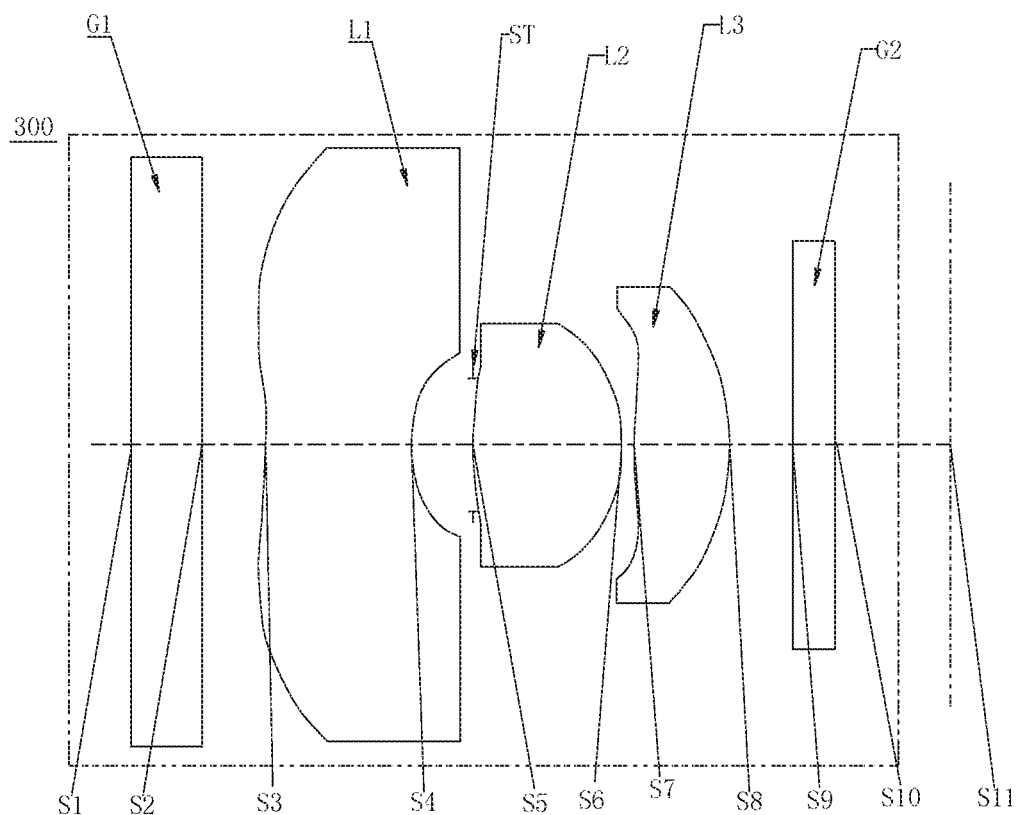
FIG. 9 is a schematic structural diagram of an optical lens in a third embodiment of the disclosure.

Please refer to FIG. 9, which is a structural diagram of an optical lens 300 provided in this embodiment. The optical lens 300 in this embodiment is substantially similar to the optical lens 100 in the first embodiment expect that: the thickness of a flat glass G1 of the optical lens 300 is different, the whole object side surface S7 of the third lens is a concave surface, and has at least one inflection point, and the curvature radius and the materials of every lens are different. In this embodiment, the vertical distance from the inflection point of the object side surface S3 of the first lens of the optical lens 300 to the optical axis is 0.425 mm, and the height of the inflection point relative to the center of the object side surface S3 of the first lens is −0.028 mm.

Related parameters of each lens of the optical lens 300 are shown in Table 5.

TABLE 5

| Surface No. | Sign | R (mm) | d (nun) | Nd | Vd |
|---|---|---|---|---|---|
|  | Object side | — |  |  |  |
| S1 | Flat glass G1 | — | 1.47900 | 1.5168 | 64.167 |
| S2 |  | — | 1.35452 |  |  |
| S3 | First lens L1 | −1.14006 | 0.49531 | 1.5439 | 55.951 |
| S4 |  | 0.69423 | 0.21377 |  |  |
|  | Stop ST | — | −0.00637 |  |  |
| S5 | Second lens L2 | 1.12115 | 0.50207 | 1.5439 | 55.951 |
| S6 |  | −0.70887 | 0.04962 |  |  |
| S7 | Third lens L3 | 1.36682 | 0.31732 | 1.5439 | 55.951 |
| S8 |  | −0.74562 | 0.22011 |  |  |
| S9 | Infrared filter G2 | — | 0.14500 | 1.5231 | 54.513 |
| S10 |  | — | 0.38867 |  |  |
| S11 | Imaging surface | — | — |  |  |

The coefficients of the aspheric surfaces of the optical lens 300 of this embodiment are shown in Table 6-1 and Table 6-2.

TABLE 6-1

| Surface No. | k | $A_4$ | $A_6$ | $A_8$ |
|---|---|---|---|---|
| S3 | −40.1516 | 6.00E−01 | −4.67E−01 | 2.01E−01 |
| S4 | −0.0909 | 4.88E+00 | 1.50E+02 | −3.10E+03 |
| S5 | 12.9577 | −4.40E+00 | 9.48E+01 | −2.01E+03 |
| S6 | 0.7919 | −4.48E+00 | 6.68E+01 | −7.59E+02 |
| S7 | 6.5815 | −4.13E+00 | 1.21E+01 | −1.29E+01 |
| S8 | −3.7502 | −5.99E−01 | 9.44E+00 | −1.05E+02 |

TABLE 6-2

| Surface No. | $A_{10}$ | $A_{12}$ | $A_{14}$ | $A_{16}$ |
|---|---|---|---|---|
| S3 | −4.11E−02 | 6.56E−02 | 8.13E−02 | −9.54E−02 |
| S4 | 3.50E+04 | −2.06E+05 | 1.95E+06 | −1.37E+07 |
| S5 | 1.04E+04 | −5.33E+04 | 3.10E+06 | −2.90E+07 |
| S6 | 2.62E+03 | 1.40E+04 | −1.31E+05 | 2.82E+05 |
| S7 | −1.53E+02 | −6.23E+01 | −1.20E+04 | 5.25E+04 |
| S8 | 4.31E+02 | −3.82E+01 | −5.05E+03 | 1.05E+04 |

Figure 10:
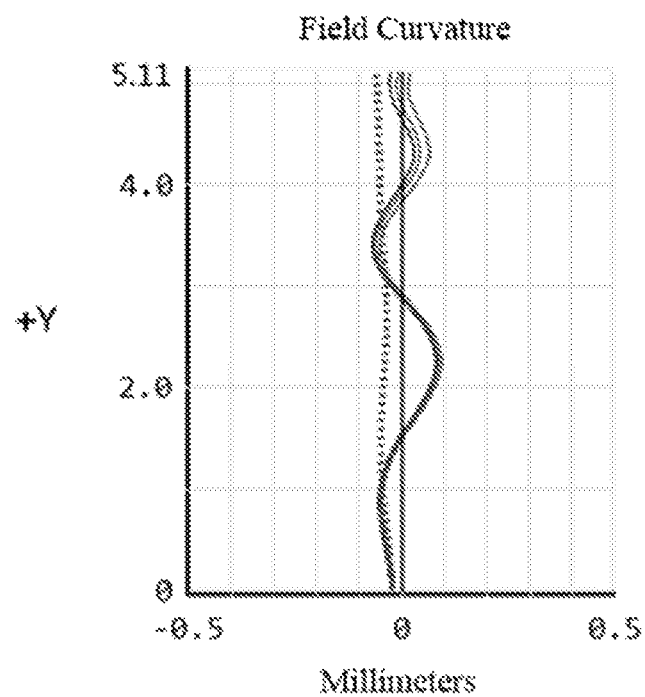
FIG. 10 is a field curvature diagram of the optical lens in the third embodiment of the disclosure.
Figure 11:
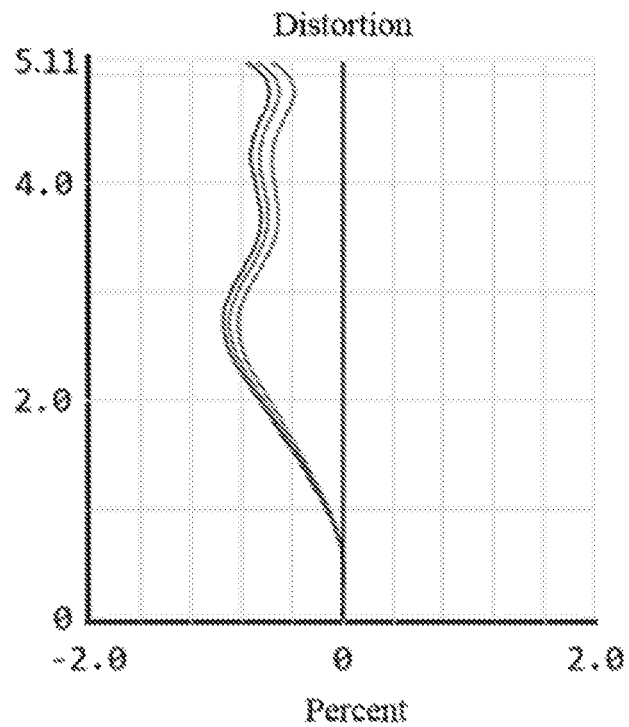
FIG. 11 is a distortion curve diagram of the optical lens in the third embodiment of the disclosure.
Figure 12:
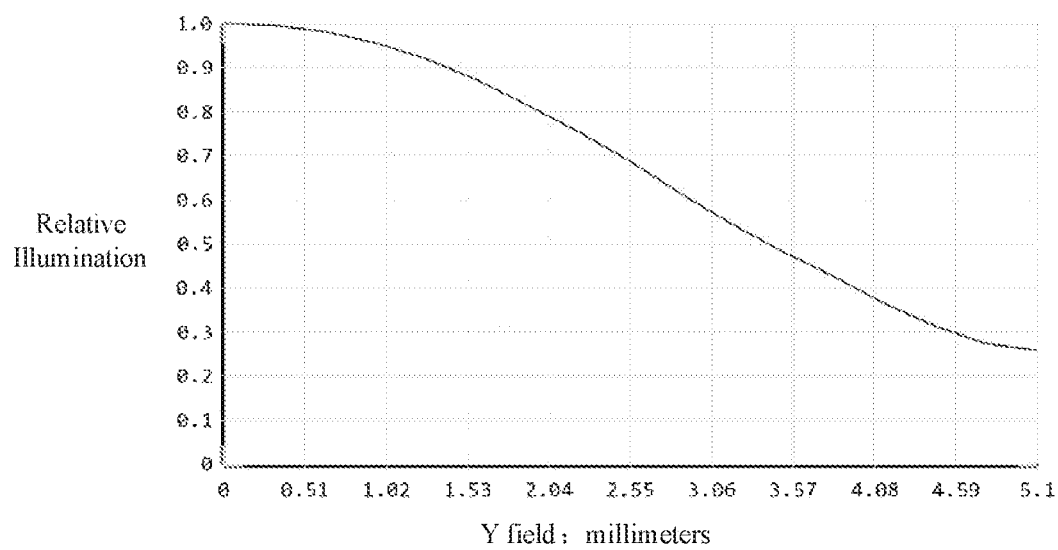
FIG. 12 is a relative illumination curve of the optical lens in the third embodiment of the disclosure.

In this embodiment, the field curvature, the distortion and the relative illumination of the optical lens 300 are respectively shown in FIG. 10, FIG. 11 and FIG. 12. As can be seen from FIG. 10, the meridional field curvature and the sagittal field curvature of this embodiment are within ±0.1 mm, which indicates the field curvature is well corrected. As can be seen from FIG. 11, the distortion of this embodiment is within ±1.2%, which indicates that the distortion is well corrected. As can be seen from FIG. 12, the relative illumination at the measured object height of 2.55 mm reaches more than 68%, and the relative illumination at the peripheral field of view is also relatively high, which indicates that the relative illumination of the optical lens 300 has been improved.

Fourth Embodiment

Figure 13:
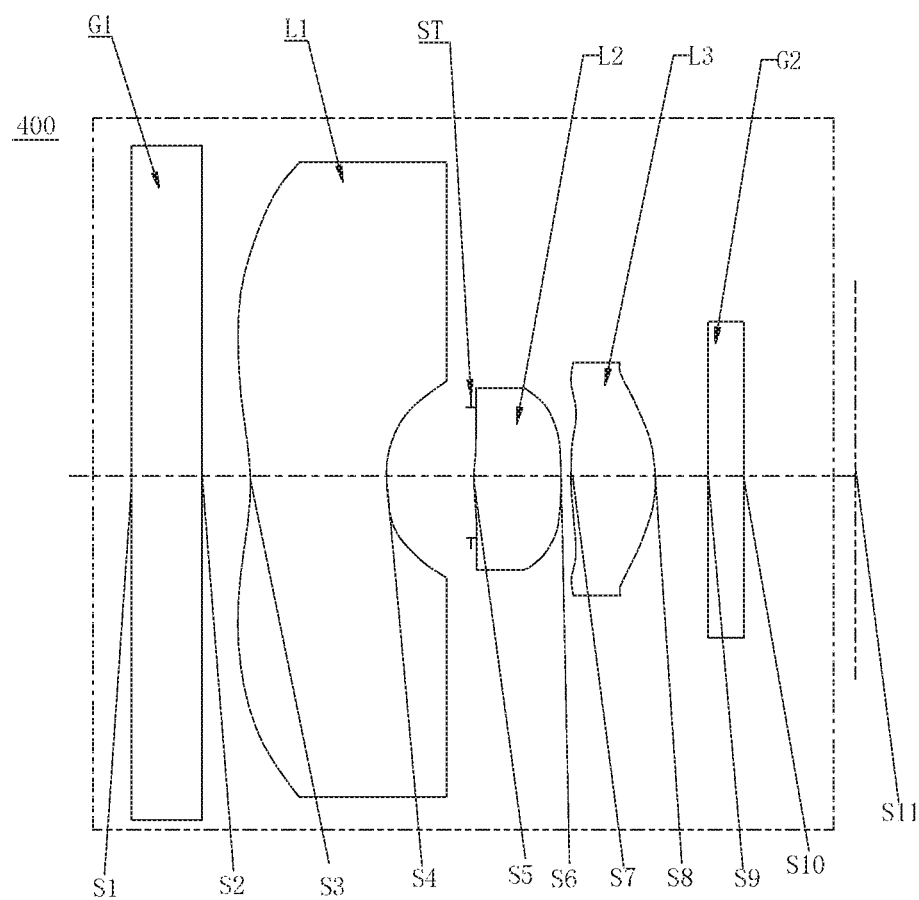
FIG. 13 is a schematic structural diagram of an optical lens in a fourth embodiment of the disclosure.

Please refer to FIG. 13, which is a structural diagram of an optical lens 400 provided in this embodiment. The optical lens 400 in this embodiment is substantially similar to the optical lens 100 in the first embodiment expect that: the curvature radius and the materials of every lens are different. In this embodiment, the vertical distance from the inflection point of the object side surface S3 of the first lens L1 of the optical lens 400 to the optical axis is 0.585 mm, and the height of the inflection point relative to the center of the object side surface S3 of the first lens L1 is −0.048 mm.

Related parameters of each lens of the optical lens 400 are shown in Table 7.

TABLE 7

| Surface No. | Sign | R (mm) | d (mm) | Nd | Vd |
|---|---|---|---|---|---|
|  | Object side | — |  |  |  |
| S1 | Flat glass G1 | — | 1.46500 | 1.5168 | 64.167 |
| S2 |  | — | 1.00355 |  |  |
| S3 | First lens L1 | −1.26339 | 0.56356 | 1.51.62 | 56.936 |
| S4 |  | 0.60564 | 0.35781 |  |  |
|  | Stop ST | — | 0.00129 |  |  |
| S5 | Second lens L2 | 1.44929 | 0.34853 | 1.5439 | 55.951 |
| S6 |  | −5.68726 | 0.04753 |  |  |
| S7 | Third lens L3 | 0.80711 | 0.34126 | 1.5439 | 55.951 |
| S8 |  | −0.51431 | 0.22011 |  |  |
| S9 | Infrared filter G2 | — | 0.14500 | 1.5231 | 54.513 |
| S10 |  | — | 0.45196 |  |  |
| S11 | Imaging surface | — | — |  |  |

The coefficients of the aspheric surfaces of the optical lens 400 of this embodiment are shown in Table 8-1 and Table 8-2.

TABLE 8-1

| Surface No. | k | $A_4$ | $A_6$ | $A_8$ |
|---|---|---|---|---|
| S3 | −19.51504 | 4.22E−01 | −4.08E−01 | 2.56E−01 |
| S4 | 1.16236 | 4.01E+00 | −6.70E+01 | 9.80E+02 |
| S5 | 27.85543 | −4.21E+00 | 1.04E+01 | −1.76E+03 |
| S6 | −296.6498 | −8.64E+00 | 4.23E+01 | −3.67E+02 |
| S7 | −25.47394 | −2.59E+00 | 1.39E+01 | −1.33E+02 |
| S8 | −2.12043 | 7.24E−01 | −3.62E+00 | −1.36E+01 |

TABLE 8-2

| Surface No. | $A_{10}$ | $A_{12}$ | $A_{14}$ | $A_{16}$ |
|---|---|---|---|---|
| S3 | −6.39E−02 | −1.13E−02 | 9.69E−03 | −1.72E−03 |
| S4 | −3.08E+03 | −3.95E+04 | 3.79E+05 | −1.11E+06 |
| S5 | 3.05E+04 | −2.71E+05 | 3.90E+04 | 2.07E+07 |
| S6 | 1.88E+03 | −2.43E+02 | −1.58E+05 | 8.23E+05 |

TABLE 8-2-continued

| Surface No. | $A_{10}$ | $A_{12}$ | $A_{14}$ | $A_{16}$ |
|---|---|---|---|---|
| S7 | −4.42E+01 | 3.94E+03 | −4.04E+02 | −3.25E+04 |
| S8 | 1.75E+02 | −3.41E+01 | −1.87E+03 | 6.04E+03 |

Figure 14:
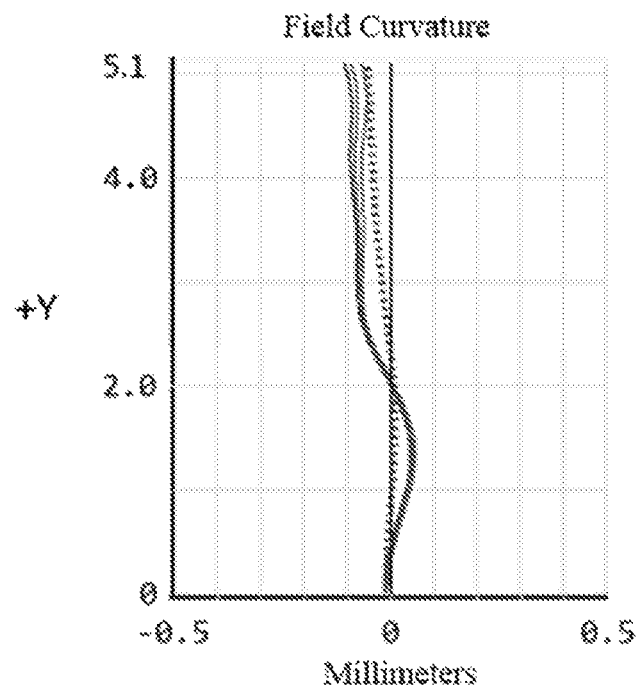
FIG. 14 is a field curvature diagram of the optical lens in the fourth embodiment of the disclosure.
Figure 15:
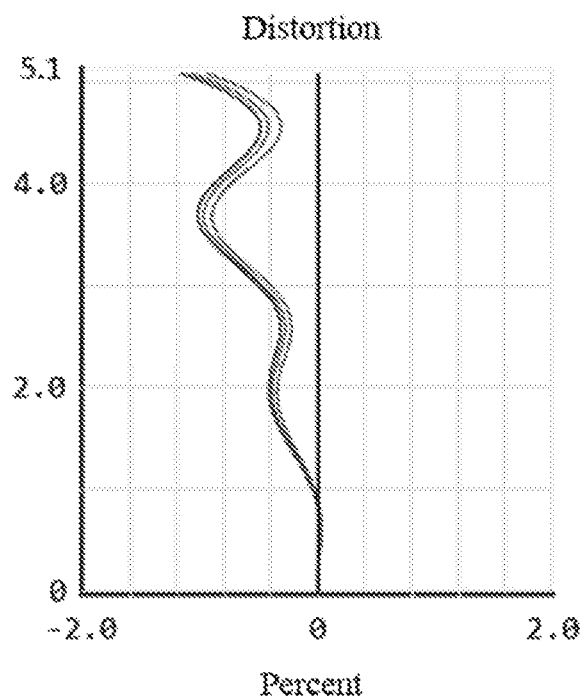
FIG. 15 is a distortion curve diagram of the optical lens in the fourth embodiment of the disclosure.
Figure 16:
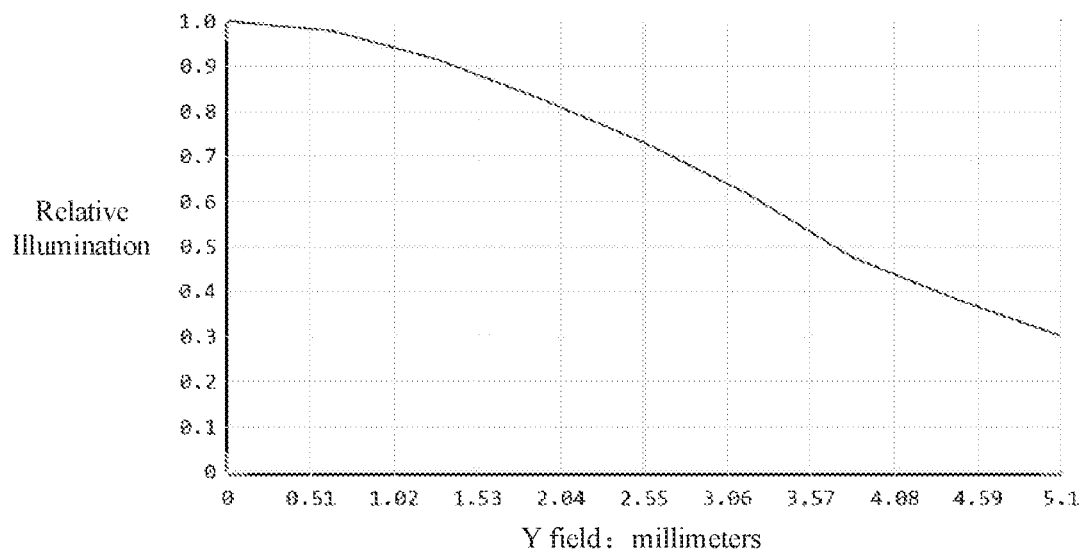
FIG. 16 is a relative illumination curve of the optical lens in the fourth embodiment of the disclosure.

In this embodiment, the field curvature, the distortion and the relative illumination of the optical lens 400 are respectively shown in FIG. 14, FIG. 15 and FIG. 16. As can be seen from FIG. 14, the meridional field curvature and the sagittal field curvature of this embodiment are within ±0.1 mm, which indicates the field curvature is well corrected. As can be seen from FIG. 15, the distortion of this embodiment is within ±1.2%, which indicates that the distortion is well corrected. As can be seen from FIG. 16, the relative illumination at the measured object height of 2.55 mm reaches more than 70%, and the relative illumination at the peripheral field of view is also relatively high, which indicates that the relative illumination of the optical lens 400 has been improved.

Table 9 shows the above four embodiments and their corresponding optical characteristics, including the effective focal length f of the optical lens, the aperture number F #, the entrance pupil diameter EPD, the total optical length TTL, and the field angle 2θ, and the value corresponding to each of the above conditional expression.

TABLE 9

| Embodiment | First embodiment | Second embodiment | Third embodiment | Fourth embodiment |
|---|---|---|---|---|
| f (mm) | 0.4106 | 0.449 | 0.441 | 0.402 |
| F# | 1.55 | 1.5 | 1.5 | 1.55 |
| TTL (mm) | 4.945 | 5.159 | 5.159 | 4.945 |
| 2θ(°) | 130.8 | 125.1 | 125.7 | 132.0 |
| EPD (mm) | 0.265 | 0.3 | 0.294 | 0.259 |
| Vd2/Vd3 | 1 | 0.997 | 1 | 1 |
| TC1/ET1 − TC1/SDM11 | 0.510 | 0.684 | 0.603 | 0.508 |
| f3/f | 1.609 | 2.107 | 2.109 | 1.568 |
| f1 + f2 + f3(mm) | 1.768 | 1.112 | 1.082 | 2.056 |
| MTC1/TC1 | 1.477 | 1.294 | 1.374 | 1.508 |
| (R31 + R32)/(R31 − R32) | 0.237 | 0.488 | 0.294 | 0.222 |
| R31/SDM31 | 1.835 | 4.272 | 3.031 | 1.695 |
| R11/f1 | −1.582 | −2.023 | −1.642 | −1.769 |
| IMC23 + TC3(mm) | 0.385 | 0.346 | 0.367 | 0.388 |
| R21/R22 | −0.487 | −1.878 | −1.582 | −0.255 |

In summary, the optical lens provided in this embodiment has at least the following advantages:

(1) The optical lens provided by the embodiment of the disclosure satisfies a high-quality image resolution, and has a large field of view, small distortion, and high relative illumination, and can improve the user's fingerprint recognition rate, and more suitable for the design requirements of the full screen of the mobile phones.

(2) Three plastic aspheric lenses are used with specific refractive power. The first lens, the second lens, and the third lens are made of low refractive index material, which greatly reduces the production cost of optical lenses, and uses specific surface shapes and combination makes the structure of the lens more compact and the size of the lens smaller while satisfying a large field of view.

(3) When the optical lens is in use, the fingerprint of user's finger is in direct contact with the flat glass, the flat glass not only plays an optical role in the optical lens, but also protects the optical lens.

Fifth Embodiment

Figure 17:
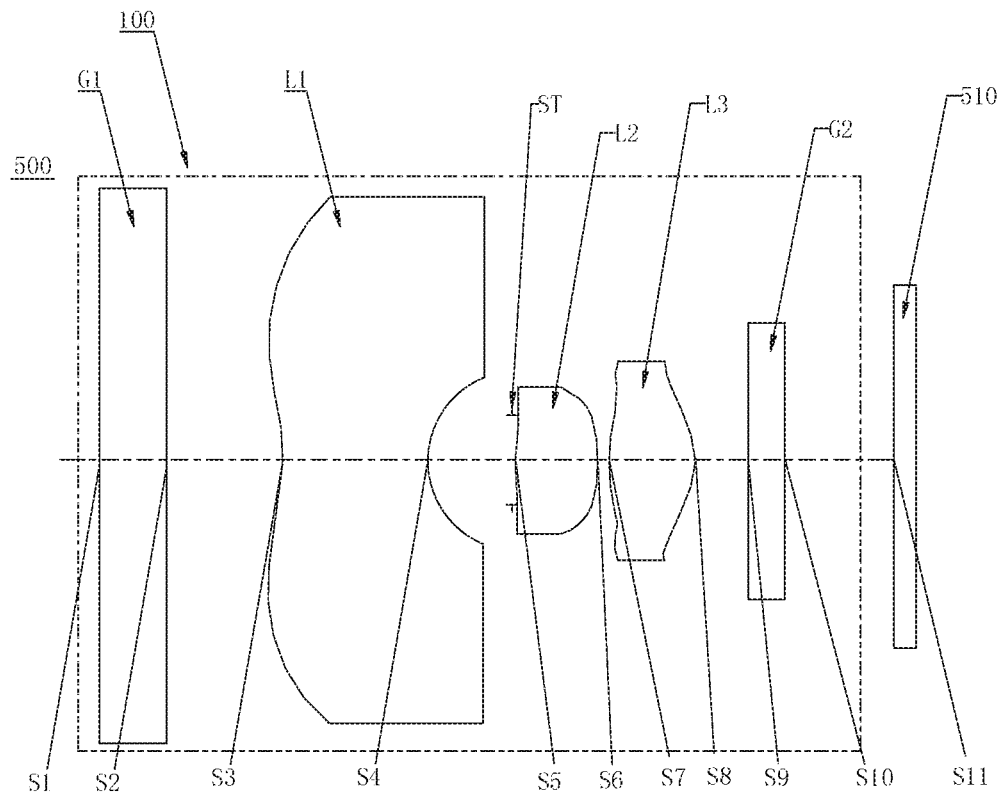
FIG. 17 is a schematic structural diagram of an imaging device in a fifth embodiment of the disclosure.

Please refer to FIG. 17, which is a structural diagram of an imaging device 500 provided in this embodiment, including the optical lens in any of the above embodiment (such as the optical lens 100) and an imaging element 510. The imaging element 510 may be a Complementary Metal Oxide Semiconductor (CMOS) image sensor, or a Charge Coupled Device (CCD) image sensor.

Sixth Embodiment

Figure 18:
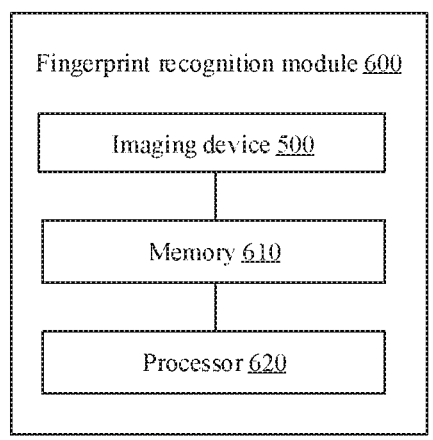
FIG. 18 is a schematic block diagram of a fingerprint recognition module in a sixth embodiment of the disclosure.

Please refer to FIG. 18, the present disclosure provides a fingerprint recognition module 600. The fingerprint recognition module 600 includes an imaging device 500 as described above, a memory 610, and a processor 620. The imaging device 500 is configured for capturing one or more fingerprint images of a user, the memory 610 is configured for storing the captured fingerprint images and at least one preset template, and the processor 620 is configured for identifying whether the captured fingerprint images match with the preset template, and determining whether to allow the user to log in or not. The image device 500 includes any one of the optical lens 100, 200, 300, 400 as described above.

The fingerprint recognition module 600 may be applied to a camera, a mobile terminal, or any other of electric devices equipped with the optical lens as described above, and the mobile terminal can be a smart phone, a smart tablet, or a smart reader.

Seventh Embodiment

Figure 19:
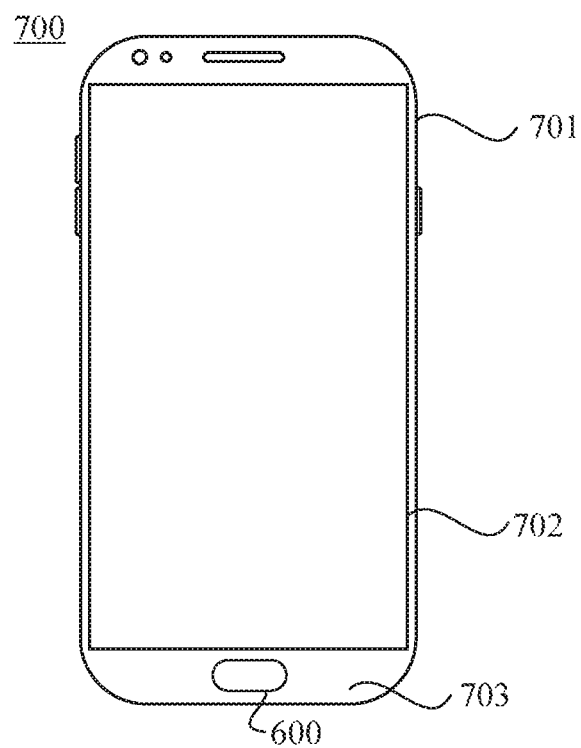
FIG. 19 is a schematic structural diagram of a mobile terminal in the seventh embodiment of the disclosure.

Please refer to FIG. 19, the present disclosure provides a mobile terminal 700. The mobile terminal 700 includes a housing 701, a display screen 702, and the fingerprint recognition module 600 as describe above. The fingerprint recognition module 600 and the display screen 702 are engaged with the housing 701, and are both exposed from a front surface 703 of the mobile terminal 700. In this embodiment, the fingerprint recognition module 600 is mounted below the display screen 702. It can be understood that the fingerprint recognition module 600 may also be mounted in other position of the mobile terminal 700. For example, in order to meet the requirements of the full-screen, the fingerprint recognition module 600 may be exposed from a rear surface of the mobile terminal 700.

The imaging device 500, the fingerprint recognition module 600, and the mobile terminal 700 provided in the disclosure includes the optical lens 100, 200, 300 or 400 as describe above. Due to the optical lens have the advantages of small volume, large field of view, small distortion, and high relative illumination, the fingerprint recognition rate of the imaging device 500, the fingerprint recognition module 600, and the mobile terminal 700 is high.

The above-mentioned embodiments are merely illustrative of several embodiments of the present disclosure, and the description thereof is more specific and detailed, however is not to be construed as limiting the scope of the disclosure. It should be noted that various variations and modifications may be made by those skilled in the art without departing from the spirit and scope of the disclosure. Therefore, the scope of the disclosure should be determined by the appended claims.

What is claimed is:

1. An optical lens, wherein the optical lens sequentially comprises a flat glass, a first lens, a stop, a second lens, a third lens, and an infrared filter along an optical axis from an object side to an image side;
the first lens has a negative refractive power, an object side surface of the first lens adjacent to the optical axis is concave and has at least one inflection point, an image side surface of the first lens is concave;
the second lens has a positive refractive power, an object surface of the second lens is convex, and an image side surface of the second lens is convex;
the third lens has a positive refractive power, an image side surface of the third lens is convex;
the first lens, the second lens and the third lens are made of a material with a refractive index of less or equal to 1.70;
the optical lens meets the expression: 1.5<f3/f<2.2, f3 represents an effective focal length of the third lens, f represents an effective focal length of the optical lens;
the optical lens meets the expression: 0.3 mm<IMC23+TC3<0.4 mm, IMC23 represents a distance along the optical axis between the image side surface of the second lens and the object side surface of the third lens, and TC3 represents a center thickness of the third lens.

2. The optical lens as claimed in claim 1, wherein the optical lens meets the expression:

$0.9<Vd2/Vd3<1$;

where Vd2 represents an abbe number of the second lens, Vd3 represents an abbe number of the third lens.

3. The optical lens as claimed in claim 1, wherein the optical lens meets the expressions;

$1.0<Nd1<1.65$;

$1.0<Nd2<1.55$;

$1.0<Nd3<1,55$;

where Nd1 represents a refractive index of the first lens, Nd2 represents a refractive index of the second lens, and Nd3 represents a refractive index of the third lens.

4. The optical lens as claimed in claim 1, wherein the optical lens meets the expression:

$0.4<(TC1/ET1)-(TC1/SDM11)<0.9$;

where TC1 represents a center thickness of the first lens, SDM11 represents a half-diameter of the object side surface of the first lens, ET1 represents an edge thickness of the first lens.

5. The optical lens as claimed in claim 1, wherein the optical lens meets the expression:

$1.0 \text{ mm}<f1+f2+f3<2.1 \text{ mm}$;

where f1 represents an effective focal length of the first lens, and f2 represents an effective focal length of the second lens.

6. The optical lens as claimed in claim 1, wherein the optical lens meets the expression:

$1.2<MTC1/TC1<1.6$;

where MTC1 represents the maximum thickness of the first lens parallel to the optical axis direction, TC1 represent a center thickness of the first lens.

7. The optical lens as claimed in claim 1, wherein the optical lens meets the expression:

$0.2<(R31+R32)/(R31-R32)<0.5$;

Where R31 represents a radius of curvature of the object side surface of the third lens, R32 represents a radius of curvature of the image side surface of the third lens.

8. The optical lens as claimed in claim 1, wherein the optical lens meets the expression:

$1.6<R31/SDM31<4.3$;

where R31 represents a radius of curvature of the object side surface of the third lens, SDM31 represents a half-diameter of the object side surface of the third lens.

9. The optical lens as claimed in claim 1, wherein the optical lens meets the expression:

$-2.1<R11/f1<-1.5$;

where R11 represents a radius of curvature of the object side surface of the first lens, f1 represents an effective focal length of the first lens.

10. The optical lens as claimed in claim 1, wherein the optical lens meets the expression:

$-1.9<R21/R22<-0.2$;

where R21 represents a radius of curvature of the object side surface of the second lens, R22 represents a radius of curvature of the image side surface of the second lens.

11. The optical lens as claimed in claim 1, wherein the first lens, the second lens and the third lens each are plastic aspherical lenses.

12. The optical lens as claimed in claim 1, wherein a sagittal height of the inflection point with respect to a center of the object side surface of the first lens is negative, an object side surface of the third lens adjacent to the optical axis is a convex surface and the whole object side surface of the third lens is a concave surface.

13. A fingerprint recognition module, comprising an optical lens, an image sensor, a memory and a processor, wherein the optical lens and the image sensor are cooperated to capture a fingerprint image, the memory is configured for storing at least one preset template and the captured fingerprint image, and the processor is configured for identifying whether the captured fingerprint image matches with the at least one preset template;
wherein the optical lens, along an optical axis from an object side to an image side, sequentially comprises:
a flat glass;
a first lens having a negative refractive power, a concave surface facing towards an imaging surface, and a concave surface facing towards the object side and having at least one inflection point;
a stop;
a second lens having a positive refractive power and two convex surfaces;
a third lens having a positive refractive power and a convex surface facing towards the imaging surface;
an infrared filter;
wherein the first lens, the second lens and the third lens each are plastic aspherical lenses, and each have a refractive index less than or equal to 1.70;
wherein the optical lens meets the expression: 1.5<f3/f<2.2, f3 represents an effective focal length of the third lens, f represents an effective focal length of the optical lens;

wherein the optical lens meets the expression:

$$0.4<(TC1/ET1)-(TC1/SDM11)<0.9;$$

$$1.2<MTC1/TC1<1.6;$$

$$0.3\ \text{mm}<IMC23+TC3<0.4\ \text{mm};$$

where TC1 represents a center thickness of the first lens, SDM11 represents a half-diameter of the object side surface of the first lens, ET1 represents an edge thickness of the first lens, MTC1 represents a maximum thickness of the first lens parallel to the optical axis direction, IMC23 represents, a distance along the optical axis between the image side surface of the second lens and the object side surface of the third lens, and TC3 represents a center thickness of the third lens.

14. The fingerprint recognition module as claimed in claim 13, wherein the optical lens meets the expression:

$$0.9<Vd2/Vd3<1;$$

where Vd2 represents an abbe number of the second lens, Vd3 represents an abbe number of the third lens.

15. The fingerprint recognition module as claimed in claim 13, wherein the optical lens meets the expressions:

$$1.0<Nd1<1.65;$$

$$1.0<Nd2<1.55;$$

$$1.0<Nd3<1.55;$$

where Nd1 represents a refractive index of the first lens, Nd2 represents a refractive index of the second lens, and Nd3 represents a refractive index of the third lens.

16. The fingerprint recognition module as claimed in claim 13, wherein the optical lens meets the expression:

$$1.0\ \text{mm}<f1+f2+f3<2.1\ \text{mm};$$

$$-2.1<R11/f1<-1.5;$$

where f1 represents an effective focal length of the first lens, f2 represents an effective focal length of the second lens, and R11 represents a radius of curvature of the object side surface of the first lens.

17. The fingerprint recognition module as claimed in claim 13, wherein the optical lens meets the expression:

$$0.2<(R31+R32)/(R31-R32)<0.5;$$

$$1.6<R31/SDM31<4.3;$$

where R31 represents a radius of curvature of the object side surface of the third lens, R32 represents a radius of curvature of an image side surface of the third lens, and SDM31 represents a half-diameter of the object side surface of the third lens.

18. The fingerprint recognition module as claimed in claim 13, wherein the optical lens meets the expression:

$$-1.9<R21/R22<-0.2;$$

where R21 represents a radius of curvature of an object side surface of the second lens, and R22 represents a radius of curvature of the image side surface of the second lens.

19. The fingerprint recognition module as claimed in claim 13, wherein a sagittal height of the inflection point with respect to a center of an object side surface of the first lens is negative, an object side surface of the third lens adjacent to the optical axis is a convex surface and the whole object side surface of the third lens is a concave surface.

20. A mobile terminal, comprising a housing, a display screen and a fingerprint recognition module, wherein the fingerprint recognition module and the display screen are engaged with the housing, the fingerprint recognition module comprises an optical lens, along an optical axis from an object side to an image side, the optical lens sequentially comprises:

a flat glass;

a first lens with a negative refractive power, an object side surface of the first lens adjacent to the optical axis being a concave surface and having at least one inflection point, an image side surface of the first lens being a concave surface;

a stop;

a second lens with a positive refractive power, an object side surface and an image side surface of the second lens both being convex surfaces;

a third lens with a positive refractive power, an image side surface of the third lens being a convex surface;

an infrared filter;

wherein the first lens, the second lens and the third lens each have a refractive index less than or equal to 1.70;

wherein the optical lens meets the expressions:

$$1.5<f3/f<2.2,$$

$$1.0\ \text{mm}<f1+f2+f3<2.1\ \text{mm};$$

$$-2.1<R11/f1<-1.5;$$

where f3 represents an effective focal length of the third lens, f represents an effective focal length of the optical lens, f1 represents an effective focal length of the first lens, f2 represents an effective focal length of the second lens, R11 represents a radius of curvature of the object side surface of the first lens;

wherein the optical lens meets the expression:

$$1.6<R31/SDM31<4.3;$$

where R31 represents a radius of curvature of an object side surface of the third lens, and SDM31 represents a half-diameter of the object side surface of the third lens.

* * * * *